United States Patent
Yang et al.

(10) Patent No.: US 10,868,325 B2
(45) Date of Patent: Dec. 15, 2020

(54) SYSTEM AND METHOD FOR PREPARING VANADIUM BATTERY HIGH-PURITY ELECTROLYTE

(71) Applicants: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

(72) Inventors: Haitao Yang, Beijing (CN); Qingshan Zhu, Beijing (CN); Chuanlin Fan, Beijing (CN); Wenheng Mu, Beijing (CN); Jibin Liu, Beijing (CN); Cunhu Wang, Beijing (CN); Qixun Ban, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

(*) Notice: Subject to any disclaimer, the term of this patent is extended or adjusted under 35 U.S.C. 154(b) by 199 days.

(21) Appl. No.: 16/073,828

(22) PCT Filed: Jan. 16, 2017

(86) PCT No.: PCT/CN2017/071206
§ 371 (c)(1),
(2) Date: Jul. 30, 2018

(87) PCT Pub. No.: WO2017/128968
PCT Pub. Date: Aug. 3, 2017

(65) Prior Publication Data
US 2019/0044171 A1 Feb. 7, 2019

(30) Foreign Application Priority Data

Jan. 28, 2016 (CN) .......................... 2016 1 0060029

(51) Int. Cl.
*H01M 8/18* (2006.01)
*H01M 10/0562* (2010.01)
(Continued)

(52) U.S. Cl.
CPC ........... *H01M 8/188* (2013.01); *B01J 8/0055* (2013.01); *B01J 8/1827* (2013.01); *B01J 14/00* (2013.01);
(Continued)

(58) Field of Classification Search
CPC . B01J 8/00; B01J 8/0015; B01J 8/0045; B01J 8/005; B01J 8/0055; B01J 8/18;
(Continued)

(56) References Cited

U.S. PATENT DOCUMENTS 849,094 A 4/1907 Zahn

FOREIGN PATENT DOCUMENTS

CN 101562256 A 10/2009
CN 101728560 A 6/2010
(Continued)

OTHER PUBLICATIONS

Machine translation of CN 103606694 A, which was published on Feb. 26, 2014 (Year: 2014).*

*Primary Examiner* — Natasha E Young
(74) *Attorney, Agent, or Firm* — Bayramoglu Law Offices LLC (57) ABSTRACT

A system and method for preparing a vanadium battery high-purity electrolyte, comprising preparing a low-valence vanadium oxide with a valence of 3.5 with liquid phase hydrolysis and fluidization reduction with vanadium
(Continued)

oxytrichloride, adding clean water and sulfuric acid for dissolution, and further performing ultraviolet activation to obtain the vanadium electrolyte, for use in an all-vanadium redox flow battery stack. The high-temperature tail gas in the reduction fluidized bed is combusted for preheating the vanadium powder material, to recover the sensible heat and latent heat of the high-temperature tail gas, and the sensible heat of the reduction product is recovered through heat transfer between the reduction product and the fluidized nitrogen gas. An internal member is arranged in the reduction fluidized bed to realize the precise regulation of the valence state of the reduction product, and ultraviolet is used to activate the vanadium ions, improving the activity of the electrolyte.

10 Claims, 1 Drawing Sheet (51) Int. Cl.
*B01J 8/00* (2006.01)
*B01J 8/18* (2006.01)
*B01J 19/00* (2006.01)
*B01J 19/24* (2006.01)
*C01G 31/02* (2006.01)
*B01J 14/00* (2006.01)

(52) U.S. Cl.
CPC ......... *B01J 19/0013* (2013.01); *B01J 19/245* (2013.01); *C01G 31/02* (2013.01); *H01M 10/0562* (2013.01); *B01J 2208/00752* (2013.01); *B01J 2208/00761* (2013.01); *B01J 2219/00074* (2013.01); *H01M 2300/0002* (2013.01); *H01M 2300/0011* (2013.01); *Y02E 60/50* (2013.01)

(58) Field of Classification Search
CPC ...... B01J 8/1818; B01J 8/1827; B01J 8/1836; B01J 8/24; B01J 8/26; B01J 14/00; B01J 19/00; B01J 19/24; B01J 2208/00743; B01J 2208/00752; B01J 2208/00761; B01J 2208/00796; B01J 2208/00893; B01J 2219/00049; B01J 2219/00051; B01J 2219/00074; H01M 8/00; H01M 8/18; H01M 8/184; H01M 8/186; H01M 8/188; H01M 10/00; H01M 10/05; H01M 10/056; H01M 10/0561; H01M 2300/00; H01M 2300/0002; H01M 2300/0005; H01M 2300/0008; H01M 2300/0011; H01M 5/0562; C01G 31/00; C01G 31/02; Y02E 60/00; Y02E 60/50; Y02E 60/52; Y02E 60/528
See application file for complete search history.

(56) References Cited

FOREIGN PATENT DOCUMENTS

| CN | 101880059 A | 11/2010 |
|---|---|---|
| CN | 102468509 A | 5/2012 |
| CN | 102557134 A | 7/2012 |
| CN | 103401010 A | 11/2013 |
| CN | 103515642 A | 1/2014 |
| CN | 103606694 A * | 2/2014 |
| CN | 103606694 A | 2/2014 |
| CN | 104319412 A | 1/2015 |
| CN | 104362360 A | 2/2015 |
| CN | 106257727 A | 12/2016 |
| WO | 8905363 A1 | 6/1989 |
| WO | 2013027076 A1 | 2/2013 |

* cited by examiner

SYSTEM AND METHOD FOR PREPARING VANADIUM BATTERY HIGH-PURITY ELECTROLYTE

CROSS REFERENCE TO RELATED APPLICATIONS

This application is based upon and claims priority to PCT Application Number PCT/CN2017/071206, now WO 2017/128968, filed on Jan. 16, 2017, which stems from Chinese Application Number 201610060029.8 filed on Jan. 28, 2016, both of which are incorporated herein by reference in their entirety.

TECHNICAL FIELD

The present invention relates to the fields of energy and chemical engineering, and more particularly to a system and method for preparing a vanadium battery high-purity electrolyte.

BACKGROUND

Traditional fossil fuels have always been the main source of energy, however, long-term exploitation and heavy use results in depletion of resources and also brings about serious environmental pollution. The development and utilization of clean renewable energy sources such as wind, water, solar, and tidal energies have gradually attracted the attention of human society. However, renewable energy sources are difficult to be effectively used by the existing energy management systems due to their inherent intermittence.

Energy storage technology is one of ways to solve such problems. In various kinds of energy storage systems, the all-vanadium redox flow battery (VRB) is an attractive energy storage device. The biggest advantage of VRB is its flexibility—power and energy storage capacity are independent The power of VRB depends on the number of battery cells and the effective electrode area of battery cells, while the energy storage capacity depends on the concentration of the active material in the electrolyte and the volume of the electrolyte. Each battery cell consists of two electrode chambers (positive and negative electrode chambers) separated by a proton exchange membrane. The electrolyte, that is the sulfate solution of vanadium, is used to store energy. When the electrolyte flows through the battery cell, redox reactions of V(IV)/V(V) and V(II)/V(II) occur in the positive and negative electrode chambers, respectively. The vanadium electrolyte is a vital component of the all-vanadium redox flow battery.

The new vanadium battery stack is generally configured using a mixed electrolyte with a concentration ratio of V(III) to V(IV) of 1:1, that is, the average valence of vanadium ions in the electrolyte is 3.5. Such electrolyte can be directly added to the positive and negative electrode chambers for use, which is easy to operate. The purity of the vanadium electrolyte plays a crucial role in performances of the battery, and high concentration of impurities in the electrolyte will bring about the following problems: (1) there is a competitive reaction between impurity ions and vanadium ions, which reduces the efficiency of the battery. (2) In the positive electrode chamber, impurity ions are deposited on the graphite felt electrode, which results in the blockage of the gap in the graphite felt and reduction of the specific surface area of the graphite felt, thus affecting charge and discharge efficiencies. (3) In the negative electrode chamber, impurity ions will affect the hydrogen evolution over-potential, and the production of the gas will affect the pressure balance inside the battery. (4) Impurity ions reduce the lifetime of the proton exchange membrane. (5) Impurity ions affect the stability of vanadium ions, leading to premature aging of the electrolyte.

The activity of the vanadium electrolyte refers to the effective concentration of the vanadium ions in the electrolyte that can be used for charge and discharge. The vanadium ions in the electrolyte are affected by the temperature, impurities, etc., and an oxygen-bridge bond will be formed, which results in the production of polycondensation, and the reduction of the electrochemical activity. Therefore, increasing the activity of the vanadium electrolyte can effectively improve the utilization efficiency of the vanadium resources, thus reducing the cost of the vanadium battery.

The methods for preparing the VRB electrolyte are as follows: (1) $VOSO_4$ method: U.S. Pat. No. 849,094 discloses a mixed electrolyte with a concentration ratio of V(III) to V(IV) of 1:1, which is prepared by dissolving $VOSO_4$ in a sulfuric acid solution, and then adjusting the valence state electrochemically. The main problem of this method lies in the more complicated preparation process of $VOSO_4$ and high price, which is not conducive to the large-scale application in VRB. $VOSO_4$ is difficult to be highly purified, thus the electrolyte prepared by such process contains more impurities. Electrochemical treatment is required to adjust the concentration ratio of V(III) to V(IV) to 1:1, so that the average valence of vanadium ions in the electrolyte is 3.5. (2) Chemical reduction method: Chinese patent CN101562256 discloses a mixed vanadium electrolyte of V(III) and V(IV), which is prepared by adding a reducing agent such as oxalic acid, butyraldehyde, etc. to the mixed system of $V_2O_5$ and a sulfuric acid solution, and keeping the mixture at 50-100° C. for 0.5-10 hours for chemical reduction. The main problem of the method lies in that it is not easy to achieve the precise control over the degree of reduction. $V_2O_5$ prepared by the existing process is difficult to be highly purified, and the electrolyte prepared by such process contains more impurities. Addition of the reducing agent will introduce a new impurity into the vanadium electrolyte system, thereby affecting the purity of the electrolyte. (3) Electrolytic method: International PCT patent AKU88/000471 describes a mixed vanadium electrolyte with a concentration ratio of V(III) to V(IV) of 1:1, which is prepared by adding the activated $V_2O_5$ to a sulfuric acid solution, and then performing constant current electrolysis. Preparation of the vanadium electrolyte by the electrolytic method is suitable for large-scale production of the electrolyte, but the process requires a preliminary activating treatment, which needs an additional electrolysis device and consumes electrical energy. Also, there is the problem of the electrolyte containing more impurities. (4) Method by dissolving a low-valence vanadium oxide: Chinese patent CN101728560A discloses that the high-purity $V_2O_3$ is used as a raw material and dissolved in 1:1 dilute sulfuric acid at a temperature of 80-150° C. to prepare a solution of $V_2(SO_4)_3$ used as a negative electrode electrolyte. The main problem of the process lies in that it is operated at a temperature of 80-150° C. (at which temperature the V(III) vanadium ion hydrate is prone to form an oxygen-bridge bond, leading to the production of polycondensation and thus a decreased electrolyte activity), and lacks an activation step. This method can only be used to prepare a negative electrode electrolyte with a narrow application area. Although the industrial high-purity $V_2O_3$ used in the patent has a total vanadium content of 67% (corresponding to a purity of 98.5%), it still contains many impurity ions. Chinese patent CN102468509A discloses a method for preparing a vanadium battery electrolyte, which comprises: preparing $V_2O_3$ by segmented calcination at 200-300° C. and 600-700° C. with ammonium metavanadate and ammonium bicarbonate as raw materials, dissolving $V_2O_3$ in a dilute sulfuric acid and reacting for 5-20 hours at 50-120° C. to obtain a $V_2(SO_4)_3$ solution, and dissolving $V_2O_5$ in the $V_2(SO_4)_3$ solution and reacting for 1-3 hours at 80-110° C. to obtain a vanadium battery electrolyte with an average vanadium ion valence of 3.5. The $V_2(SO_4)_3$ solution is prepared as the negative electrode electrolyte in this patent The main problem of the method lies in the long-time dissolution operation at a higher temperature (at which temperature the V(II) vanadium ion hydrate is prone to form an oxygen-bridge bond, leading to the production of polycondensation and thus a decreased electrolyte activity), and lack of an activation step; and the purity of the electrolyte is not high. Chinese patent CN103401010A discloses a method for preparing an all-vanadium redox flow battery electrolyte, which comprises: reducing $V_2O_5$ powder in hydrogen to prepare $V_2O_4$ powder and $V_2O_3$ powder, dissolving $V_2O_4$ and $V_2O_3$ in the concentrated sulfuric acid respectively to obtain the positive and negative electrode electrolytes of the vanadium battery. The main problem of the patent lies in that no specific reduction process is provided. The $V_2O_4$ powder is prepared by reducing $V_2O_5$ in hydrogen, however, in the process, over-reduction or under-reduction is prone to occur and the process only can be achieved by precise control, but the patent does not provide measures about the precise control of reduction. In addition, the purity is low. Chinese patents CN101880059A and CN102557134A disclose a fluidized reduction furnace and reduction method for producing high-purity vanadium trioxide, wherein a heat transfer internal member is added in a fluidized bed to achieve the enhanced heat transfer; and cyclone preheating is used to increase the energy utilization rate and realize the efficient preparation of $V_2O_3$. However, since the systems do not have the function of precise control of reduction, the methods described in these two patents are only suitable for the preparation of $V_2O_3$ and not suitable for the preparation of other low-valence vanadium oxides.

In summary, there is an urgent need in the art to solve the disadvantages of the process and technology for preparation of the all-vanadium redox flow battery electrolyte, so as to simplify the preparation process, increase the purity and activity of the electrolyte, and improve the simplicity of electrolyte preparation and use.

SUMMARY

In view of the above problems, the present invention proposes a system and method for preparing a vanadium battery high-purity electrolyte, to simplify the preparation process, increase the purity of the electrolyte, improve the simplicity of electrolyte preparation, and facilitate the transportation. In order to achieve these objectives, the present invention adopts the following technical solutions.

Figure 1:
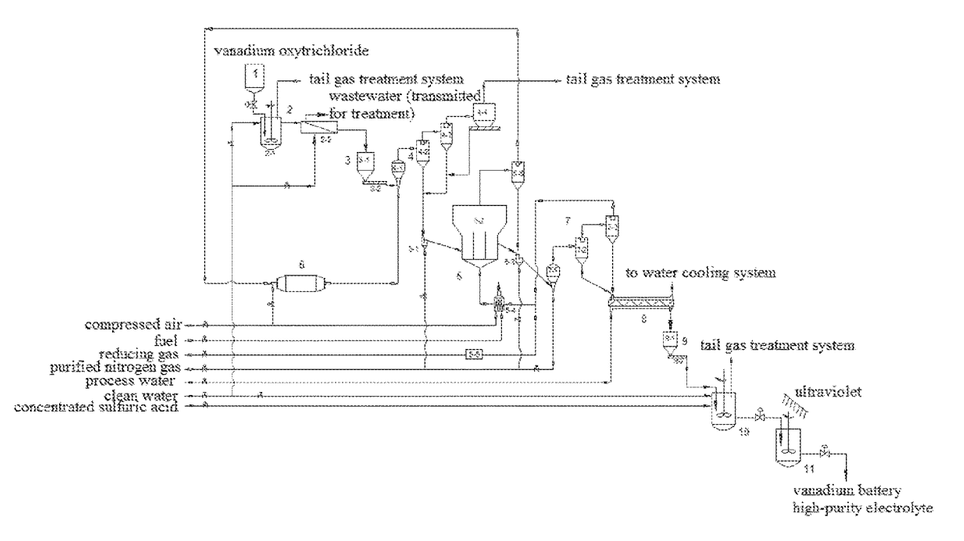
FIG. 1 is a schematic diagram illustrating the configuration of a system for preparing a vanadium battery high-purity electrolyte according to the present invention.

The present invention provides a system for preparing a vanadium battery high-purity electrolyte, comprising a vanadium oxytrichloride storage tank 1, a liquid phase hydrolysis device 2, a vanadium pentoxide feeding device 3, a preheating system 4, a reduction fluidized bed 5, a combustion chamber 6, a cooling system 7, a secondary cooling system 8, a low-valence vanadium oxide feeding device 9, a dissolution reactor 10 and an activation device 11;

wherein the liquid phase hydrolysis device 2 comprises a liquid phase hydrolysis reaction tank 2-1 and a washing filter 2-2;

the vanadium pentoxide feeding device 3 comprises a vanadium pentoxide hopper 3-1 and a vanadium pentoxide screw feeder 3-2;

the preheating system 4 comprises a venturi preheater 4-1, a primary cyclone preheater 4-2, a secondary cyclone preheater 4-3 and a bag-type dust collector 4-4;

the reduction fluidized bed 5 comprises a feeder 5-1, a bed body 5-2, a discharger 5-3, a gas heater 5-4, a gas purifier 5-5 and a first cyclone separator 5-6;

the cooling system 7 comprises a venturi cooler 7-1, a cyclone cooler 7-2 and a second cyclone separator 7-3;

the low-valence vanadium oxide feeding device 9 comprises a low-valence vanadium oxide hopper 9-1 and a low-valence vanadium oxide screw feeder 9-2;

wherein a feed outlet at the bottom of the vanadium oxytrichloride storage tank 1 is connected with a chloride inlet of the liquid phase hydrolysis reaction tank 2-1 through a pipeline; a clean water inlet of the liquid phase hydrolysis reaction tank 2-1 is connected with a clean water main pipe through a pipeline; an acid gas outlet of the liquid phase hydrolysis reaction tank 2-1 is connected with a tail gas treatment system; a slurry outlet of the liquid phase hydrolysis reaction tank 2-1 is connected with a slurry inlet of the washing filter 2-2 through a pipeline; a clean water inlet of the washing filter 2-2 is connected with the clean water main pipe; a washing liquid outlet of the washing filter 2-2 is connected with a wastewater treatment system through a pipeline; and a solid material outlet of the washing filter 2-2 is connected with a feed inlet of the vanadium pentoxide hopper 3-1 through a pipeline;

a feed outlet at the bottom of the vanadium pentoxide hopper 3-1 is connected with a feed inlet of the vanadium pentoxide screw feeder 3-2; and a feed outlet of the vanadium pentoxide screw feeder 3-2 is connected with a feed inlet of the venturi preheater 4-1 through a pipeline;

a gas inlet of the venturi preheater 4-1 is connected with a gas outlet of the combustion chamber 6 through a pipeline; a gas outlet of the venturi preheater 4-1 is connected with a gas inlet of the primary cyclone preheater 4-2 through a pipeline; a gas outlet of the primary cyclone preheater is connected with a gas inlet of the secondary cyclone preheater through a pipeline; a feed outlet of the primary cyclone preheater 4-2 is connected with a feed inlet of the feeder 5-1 through a pipeline; a gas outlet of the secondary cyclone preheater 4-3 is connected with a gas inlet of the bag-type dust collector 4-4 through a pipeline; a feed outlet of the secondary cyclone preheater 4-3 is connected with the feed inlet of the feeder 5-1 through a pipeline; a gas outlet of the bag-type dust collector 4-4 is connected with the tail gas treatment system; and a feed outlet of the bag-type dust collector 4-4 is connected with the feed inlet of the feeder 5-1 through a pipeline;

an aeration air inlet of the feeder 5-1 is connected with a purified nitrogen gas main pipe; a feed outlet of the feeder 5-1 is connected with a feed inlet of the bed body 5-2 through a pipeline; a gas inlet of the bed body 5-2 is connected with a gas outlet of the gas heater 5-4 through a pipeline; a gas inlet of the gas heater 5-4 is connected with a gas outlet of the second cyclone separator 7-3 and a gas outlet of the gas purifier 5-5 through pipelines; a combustion air inlet of the gas heater 5-4 is connected with a compressed air main pipe; a fuel inlet of the gas heater 5-4 is connected with a fuel main pipe; a gas inlet of the gas purifier 5-5 is connected with a reducing gas main pipe; a feed outlet of the bed body 5-2 is connected with a feed inlet of the discharger 5-3 through a pipeline; an aeration air inlet of the discharger 5-3 is connected with the purified nitrogen gas main pipe; a feed outlet of the discharger 5-3 is connected with a feed inlet of the venturi cooler 7-1 through a pipeline; a gas outlet of the bed body 5-2 is connected with a gas inlet of the first cyclone separator 5-6 through a pipeline; a feed outlet of the first cyclone separator 5-6 is connected with the feed inlet of the discharger 5-3 through a pipeline; and a gas outlet of the first cyclone separator 5-6 is connected with a gas inlet of the combustion chamber 6 through a pipeline;

a combustion air inlet of the combustion chamber 6 is connected with the compressed air main pipe; and the gas outlet of the combustion chamber 6 is connected with the gas inlet of the venturi preheater through a pipeline;

a gas inlet of the venturi cooler 7-1 is connected with the purified nitrogen gas main pipe; a gas outlet of the venturi cooler 7-1 is connected with a gas inlet of the cyclone cooler 7-2 through a pipeline; a gas outlet of the cyclone cooler 7-2 is connected with a gas inlet of the second cyclone separator 7-3 through a pipeline; a feed outlet of the cyclone cooler 7-2 is connected with a feed inlet of the secondary cooling device 8 through a pipeline; the gas outlet of the second cyclone separator 7-3 is connected with a gas inlet of the gas heater 5-4 through a pipeline; and a feed outlet of the second cyclone separator 7-3 is connected with a feed inlet of the secondary cooling device 8 through a pipeline;

a feed outlet of the secondary cooling device 8 is connected with a feed inlet of the low-valence vanadium oxide hopper 9-1 through a pipeline; a process water inlet of the secondary cooling device 8 is connected with a process water main pipe through a pipeline; and a water outlet of the secondary cooling device 8 is connected with a water cooling system through a pipeline;

a feed outlet at the bottom of the low-valence vanadium oxide hopper 9-1 is connected with a feed inlet of the low-valence vanadium oxide screw feeder 9-2; and a feed outlet of the low-valence vanadium oxide screw feeder 9-2 is connected with a feed inlet of the dissolution reactor 10 through a pipeline;

a clean water inlet of the dissolution reactor 10 is connected with the clean water main pipe through a pipeline; a concentrated sulfuric acid inlet of the dissolution reactor 10 is connected with a concentrated sulfuric acid main pipe through a pipeline; a gas outlet of the dissolution reactor 10 is connected with the tail gas treatment system; and a primary electrolyte outlet of the dissolution reactor 10 is connected with a primary electrolyte inlet of the activation device 11 through a pipeline.

The present invention further provides a method for preparing a vanadium battery high-purity electrolyte based on the above system, which comprises the following steps:

allowing vanadium oxytrichloride liquid in the vanadium oxytrichloride storage tank 1 to enter the liquid phase hydrolysis reaction tank 2-1 through a pipeline, and then be subjected to hydrolysis precipitation together with clean water from the clean water main pipe to form a mixed slurry of vanadium pentoxide precipitate and hydrochloric acid solution; transmitting the produced acid gas to the tail gas treatment system through a pipeline; allowing the slurry to enter the washing filter 2-2 and be subjected to washing with clean water and filtration to obtain washing liquid and vanadium pentoxide precipitate powder; transmitting the washing liquid to the wastewater treatment system; and transmitting the vanadium pentoxide precipitate to the vanadium pentoxide hopper 3-1;

allowing the vanadium pentoxide precipitate in the vanadium pentoxide hopper 3-1 to enter the primary cyclone preheater 4-2 through the vanadium pentoxide screw feeder 3-2 and the venturi preheater 4-1 in turn, and enter the bed body 5-2 through the feeder 5-1 together with the fine powder recovered by the secondary cyclone preheater 4-3 and the bag-type dust collector 4-4; and allowing purified nitrogen gas from the purified nitrogen gas main pipe to enter the venturi cooler 7-1, the cyclone cooler 7-2 and the second cyclone separator 7-3 in turn, and be merged with the purified reducing gas from the gas purifier 5-5, and be preheated by the gas heater 5-4 and then be transmitted to the bed body 5-2, such that the vanadium pentoxide powder material is kept at a fluidized state and reduced to obtain low-valence vanadium oxide powder having an average vanadium valence of 3.5 and reduction flue gas;

allowing the low-valence vanadium oxide to enter the cyclone cooler 7-2 through the discharger 5-3 and the venturi cooler 7-1 in turn, and enter the dissolution reactor 10 through the secondary cooling device 8, the low-valence vanadium oxide hopper 9-1 and the low-valence vanadium oxide screw feeder 9-2 together with the fine powder recovered by the second cyclone separator 7-3, and undergo dissolution reaction with clean water from the clean water main pipe and concentrated sulfuric acid from the concentrated sulfuric acid main pipe to obtain a primary electrolyte, transmitting the produced acid mist gas to the tail gas treatment system, and activating the primary electrolyte by the activation device 11, to obtain the vanadium battery high-purity electrolyte;

wherein the produced reduction flue gas is subjected to dust removing by the first cyclone separator 5-6, and then transmitted to the combustion chamber 6 together with combustion air, and the produced high-temperature flue gas enters the venturi preheater 4-1, the primary cyclone preheater 4-2 and the secondary cyclone preheater 4-3 in turn, and is subjected to dust removing by the bag-type dust collector 4-4 and then transmitted to the tail gas treatment system.

The first characteristic of the present invention lies in that: the bed body of the reduction fluidized bed is in the form of a rectangular multi-bin, with a built-in vertical baffle.

The second characteristic of the present invention lies in that: the raw material of vanadium oxytrichloride has a purity of 99%-99.9999%, i.e., 2N-6N.

The third characteristic of the present invention lies in that: in the liquid phase hydrolysis reaction tank 2-1, the mass ratio of clean water to vanadium oxytrichloride added is 0.5-20, and the operation temperature is 30-90° C.

The fourth characteristic of the present invention lies in that: the reducing gas introduced into the reducing gas purifier 5-5 is hydrogen gas or coal gas.

The fifth characteristic of the present invention lies in that: in the reduction fluidized bed body 5-2, the operation temperature is 300-700° C. in the reduction, and after the reducing gas is purified by the purifier 5-5, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 20-120 min.

The sixth characteristic of the present invention lies in that: in the dissolution reactor 10, the resistivity of the added clean water is not less than 12.0 MΩ·cm, the concentrated sulfuric acid is electronic-grade concentrated sulfuric acid, and the dissolution temperature is 30-90° C.

The seventh characteristic of the present invention lies in that: the vanadium electrolyte is a mixed electrolyte with the molar concentration ratio of vanadium ions V(III) to V(IV) of 1:1, and the average valence of vanadium ions is 3.5, and the vanadium electrolyte can be directly used in a new all-vanadium redox flow battery stack.

The eighth characteristic of the present invention lies in that: in the activation device 11, the vanadium ions are activated by means of ultraviolet, wherein the dissolution and activation time is 30-300 minutes, the dissolution and activation temperature is 20-45° C., and the power density is 10-300 $W/m^3$.

The electrolyte produced by the present invention is of high purity, high activity and simple assembly. The present invention has the following outstanding advantages:

(1) High purity: vanadium oxytrichloride which is easy to be highly purified is used as a raw material, and it is easy to obtain high-purity vanadium oxytrichloride with a purity of 2N-6N. Taking 5N vanadium oxytrichloride for example, a low-valence vanadium oxide with a purity of 4N5 (i.e., a purity of 99.995%) can be prepared by the present invention, and therefore a high-purity vanadium electrolyte can be formulated. In addition to the effective components, the total impurity content is lower than 5 ppm.

(2) Liquid phase hydrolysis: the operation is simple, which is convenient for industrial application.

(3) Realizing the heat utilization of the high-temperature tail gas and high-temperature reduction product in the fluidized bed: the high-temperature tail gas in the reduction fluidized bed is combusted for preheating of the vanadium powder material, so as to recover the sensible heat and latent heat of the high-temperature tail gas, and the sensible heat of the reduction product is recovered through the heat exchange between the reduction product and the fluidized nitrogen gas.

(4) Precise control of reduction: a rectangular multi-bin fluidized bed is used to achieve precise control over reduction of the valence state.

(5) High activity: the vanadium ions are activated by means of ultraviolet irradiation, which significantly improves the activity of the electrolyte.

(6) Convenient transportation: the process for producing the electrolyte is short, and suitable for on-site configuration of vanadium batteries, and the low-valence vanadium oxide can be transported, thereby greatly reducing the transportation cost.

(7) 3.5-valence electrolyte: the electrolyte is suitable for configuration of a new vanadium battery stack, and can be directly added to positive and negative electrode chambers for use, which is simple to operate.

The present invention has the advantages of low energy consumption in production and low operation cost, high product purity, stable quality, simple electrolyte preparation and assembly and so on, and is suitable for the large-scale industrial production of the all-vanadium redox flow battery electrolyte, with good economic and social benefits.

BRIEF DESCRIPTION OF THE DRAWINGS

The accompanying drawing is used to provide further illustration of the present invention and constitutes a part of the specification. It is used to explain the present invention together with the examples of the present invention, rather than limit the present invention.

DETAILED DESCRIPTION OF THE EMBODIMENTS

In order to make the object, technical solution, and advantages of the present invention be clearer, the technical solution in the examples of the present invention will be described clearly and completely below with reference to the accompanying drawing of the examples of the present invention. Obviously, the described examples are only a part of the examples of the present invention, not all examples. It is worth noting that the examples are merely used for illustrating the technical solution of the present invention, rather than limiting the present invention. FIG. 1 is a schematic diagram of a system and method for preparing a vanadium battery high-purity electrolyte according to the present invention.

FIG. 1 includes the following designators:
 1 Vanadium oxytrichloride storage tank
 2 Liquid phase hydrolysis device
 2-1 Liquid phase hydrolysis reaction tank
 2-2 Washing filter
 3 Vanadium pentoxide feeding device
 3-1 Vanadium pentoxide hopper
 3-2 Vanadium pentoxide screw feeder
 4 Preheating system
 4-1 Venturi preheater
 4-2 Primary cyclone preheater
 4-3 Secondary cyclone preheater
 4-4 Bag-type dust collector
 5 Reduction fluidized bed
 5-1 Feeder
 5-2 Bed body
 5-3 Discharger
 5-4 Gas heater
 5-5 Gas purifier
 5-6 First cyclone separator
 6 Combustion chamber
 7 Cooling system
 7-1 Venturi cooler
 7-2 Cyclone cooler
 7-3 Second cyclone separator
 8 Secondary cooling system
 9 Low-valence vanadium oxide feeding device
 9-1 Low-valence vanadium oxide hopper
 9-2 Low-valence vanadium oxide screw feeder
 10 Dissolution reactor
 11 Activation device

Example 1

With reference to FIG. 1, the system for preparing a vanadium battery high-purity electrolyte used in this example comprises a vanadium oxytrichloride storage tank 1, a liquid phase hydrolysis device 2, a vanadium pentoxide feeding device 3, a preheating system 4, a reduction fluidized bed 5, a combustion chamber 6, a cooling system 7, a secondary cooling system 8, a low-valence vanadium oxide feeding device 9, a dissolution reactor 10 and an activation device 11.

The liquid phase hydrolysis device 2 comprises a liquid phase hydrolysis reaction tank 2-1 and a washing filter 2-2.

The vanadium pentoxide feeding device 3 comprises a vanadium pentoxide hopper 3-1 and a vanadium pentoxide screw feeder 3-2.

The preheating system 4 comprises a venturi preheater 4-1, a primary cyclone preheater 4-2, a secondary cyclone preheater 4-3 and a bag-type dust collector 4-4.

The reduction fluidized bed 5 comprises a feeder 5-1, a bed body 5-2, a discharger 5-3, a gas heater 5-4, a gas purifier 5-5 and a first cyclone separator 5-6.

The cooling system 7 comprises a venturi cooler 7-1, a cyclone cooler 7-2 and a second cyclone separator 7-3.

The low-valence vanadium oxide feeding device 9 comprises a low-valence vanadium oxide hopper 9-1 and a low-valence vanadium oxide screw feeder 9-2.

A feed outlet at the bottom of the vanadium oxytrichloride storage tank 1 is connected with a chloride inlet of the liquid phase hydrolysis reaction tank 2-1 through a pipeline; a clean water inlet of the liquid phase hydrolysis reaction tank 2-1 is connected with a clean water main pipe through a pipeline; an acid gas outlet of the liquid phase hydrolysis reaction tank 2-1 is connected with a tail gas treatment system; a slurry outlet of the liquid phase hydrolysis reaction tank 2-1 is connected with a slurry inlet of the washing filter 2-2 through a pipeline; a clean water inlet of the washing filter 2-2 is connected with the clean water main pipe; a washing liquid outlet of the washing filter 2-2 is connected with a wastewater treatment system through a pipeline; and a solid material outlet of the washing filter 2-2 is connected with a feed inlet of the vanadium pentoxide hopper 3-1 through a pipeline.

A feed outlet at the bottom of the vanadium pentoxide hopper 3-1 is connected with a feed inlet of the vanadium pentoxide screw feeder 3-2; and a feed outlet of the vanadium pentoxide screw feeder 3-2 is connected with a feed inlet of the venturi preheater 4-1 through a pipeline.

A gas inlet of the venturi preheater 4-1 is connected with a gas outlet of the combustion chamber 6 through a pipeline; a gas outlet of the venturi preheater 4-1 is connected with a gas inlet of the primary cyclone preheater 4-2 through a pipeline; a gas outlet of the primary cyclone preheater is connected with a gas inlet of the secondary cyclone preheater through a pipeline; a feed outlet of the primary cyclone preheater 4-2 is connected with a feed inlet of the feeder 5-1 through a pipeline; a gas outlet of the secondary cyclone preheater 4-3 is connected with a gas inlet of the bag-type dust collector 4-4 through a pipeline; a feed outlet of the secondary cyclone preheater 4-3 is connected with the feed inlet of the feeder 5-1 through a pipeline; a gas outlet of the bag-type dust collector 4-4 is connected with the tail gas treatment system; and a feed outlet of the bag-type dust collector 4-4 is connected with the feed inlet of the feeder 5-1 through a pipeline.

An aeration air inlet of the feeder 5-1 is connected with a purified nitrogen gas main pipe; a feed outlet of the feeder 5-1 is connected with a feed inlet of the bed body 5-2 through a pipeline; a gas inlet of the bed body 5-2 is connected with a gas outlet of the gas heater 5-4 through a pipeline; a gas inlet of the gas heater is connected with a gas outlet of the second cyclone separator 7-3 and a gas outlet of the gas purifier 5-5 through pipelines; a combustion air inlet of the gas heater 5-4 is connected with a compressed air main pipe; a fuel inlet of the gas heater 5-4 is connected with a fuel main pipe; a gas inlet of the gas purifier 5-5 is connected with a reducing gas main pipe; a feed outlet of the bed body 5-2 is connected with a feed inlet of the discharger 5-3 through a pipeline; an aeration air inlet of the discharger 5-3 is connected with the purified nitrogen gas main pipe; a feed outlet of the discharger 5-3 is connected with a feed inlet of the venturi cooler 7-1 through a pipeline; a gas outlet of the bed body 5-2 is connected with a gas inlet of the first cyclone separator 5-6 through a pipeline; a feed outlet of the first cyclone separator 5-6 is connected with the feed inlet of the discharger 5-3 through a pipeline; and a gas outlet of the first cyclone separator 5-6 is connected with a gas inlet of the combustion chamber 6 through a pipeline.

A combustion air inlet of the combustion chamber 6 is connected with the compressed air main pipe; and the gas outlet of the combustion chamber 6 is connected with the gas inlet of the venturi preheater through a pipeline.

A gas inlet of the venturi cooler 7-1 is connected with the purified nitrogen gas main pipe; a gas outlet of the venturi cooler 7-1 is connected with a gas inlet of the cyclone cooler 7-2 through a pipeline; a gas outlet of the cyclone cooler 7-2 is connected with a gas inlet of the second cyclone separator 7-3 through a pipeline; a feed outlet of the cyclone cooler 7-2 is connected with a feed inlet of the secondary cooling device 8 through a pipeline; the gas outlet of the second cyclone separator 7-3 is connected with a gas inlet of the gas heater 5-4 through a pipeline; and a feed outlet of the second cyclone separator 7-3 is connected with a feed inlet of the secondary cooling device 8 through a pipeline.

A feed outlet of the secondary cooling device 8 is connected with a feed inlet of the low-valence vanadium oxide hopper 9-1 through a pipeline; a process water inlet of the secondary cooling device 8 is connected with a process water main pipe through a pipeline; and a water outlet of the secondary cooling device 8 is connected with a water cooling system through a pipeline.

A feed outlet at the bottom of the low-valence vanadium oxide hopper 9-1 is connected with a feed inlet of the low-valence vanadium oxide screw feeder 9-2; and a feed outlet of the low-valence vanadium oxide screw feeder 9-2 is connected with a feed inlet of the dissolution reactor 10 through a pipeline.

A clean water inlet of the dissolution reactor 10 is connected with the clean water main pipe through a pipeline; a concentrated sulfuric acid inlet of the dissolution reactor 10 is connected with a concentrated sulfuric acid main pipe through a pipeline; a gas outlet of the dissolution reactor 10 is connected with the tail gas treatment system; and a primary electrolyte outlet of the dissolution reactor 10 is connected with a primary electrolyte inlet of the activation device 11 through a pipeline.

Example 2

The above system is used in this example to prepare a vanadium battery high-purity electrolyte. The method specifically comprises the following steps.

A vanadium oxytrichloride liquid in the vanadium oxytrichloride storage tank 1 enters the liquid phase hydrolysis reaction tank 2-1 through a pipeline, and then is subjected to hydrolysis precipitation together with clean water from the clean water main pipe to form a mixed slurry of vanadium pentoxide precipitate and hydrochloric acid solution. The produced acid gas is transmitted to the tail gas treatment system through a pipeline. The slurry enters the washing filter 2-2 and is subjected to washing with clean water and filtration to obtain washing liquid and vanadium pentoxide precipitate powder. The washing liquid is transmitted to the wastewater treatment system. The vanadium pentoxide precipitate is transmitted to the vanadium pentoxide hopper 3-1.

The vanadium pentoxide precipitate in the vanadium pentoxide hopper 3-1 enters the primary cyclone preheater 4-2 through the vanadium pentoxide screw feeder 3-2 and the venturi preheater 4-1 in turn, and enters the bed body 5-2 through the feeder 5-1 together with the fine powder recovered by the secondary cyclone preheater 4-3 and the bag-type dust collector 4-4. Purified nitrogen gas from the purified nitrogen gas main pipe enters the venturi cooler 7-1, the cyclone cooler 7-2 and the second cyclone separator 7-3 in turn, and is merged with the purified reducing gas from the gas purifier 5-5, and is preheated by the gas heater 5-4 and then is transmitted to the bed body 5-2, such that the vanadium pentoxide powder material is kept at a fluidized state and reduced to obtain low-valence vanadium oxide powder having an average vanadium valence of 3.5 and reduction flue gas. The low-valence vanadium oxide enters the cyclone cooler 7-2 through the discharger 5-3 and the venturi cooler 7-1 in turn, and enters the dissolution reactor 10 through the secondary cooling device 8, the low-valence vanadium oxide hopper 9-1 and the low-valence vanadium oxide screw feeder 9-2 together with the fine powder recovered by the second cyclone separator 7-3, and undergoes dissolution reaction with clean water from the clean water main pipe and concentrated sulfuric acid from the concentrated sulfuric acid main pipe to obtain a primary electrolyte, the produced acid mist gas is transmitted to the tail gas treatment system, and the primary electrolyte is activated by the activation device 11, to obtain the vanadium battery high-purity electrolyte. Wherein the produced reduction flue gas is subjected to dust removing by the first cyclone separator 5-6, and then transmitted to the combustion chamber 6 together with combustion air, and the produced high-temperature flue gas enters the venturi preheater 4-1, the primary cyclone preheater 4-2 and the secondary cyclone preheater 4-3 in turn, and is subjected to dust removing by the bag-type dust collector 4-4 and then transmitted to the tail gas treatment system.

Example 3

In this example, vanadium oxytrichloride (with a purity of above 2N) was used as a raw material, and the throughput was 3 kg/h. In the liquid phase hydrolysis reaction tank 2-1, clean water (having a resistivity of 15.0 MΩ·cm) and vanadium oxytrichloride were added in a mass ratio of 0.5, and the operation temperature was set to be 90° C., to obtain a slurry of vanadium pentoxide. The slurry entered the washing filter 2-2 to be subjected to washing with clean water (having a resistivity of 15.0 MΩ·cm) and filtration, to obtain washing liquid and vanadium pentoxide precipitate powder, wherein the washing liquid was transmitted to the wastewater treatment system, and the vanadium pentoxide precipitate was preheated by the preheating system and then entered the reduction fluidized bed. In the reduction fluidized bed 5, the reducing gas introduced was coal gas, the volume fraction of coal gas in the mixed gas of the nitrogen gas and coal gas introduced into the reduction fluidized bed 5 was 10%, the average residence time of the powder was 120 min, and the operation temperature was 300° C., and a low-valence vanadium oxide having an average vanadium valence of 3.5 and a purity of 98.5% was obtained. In the dissolution reactor, electronic-grade concentrated sulfuric acid and clean water (having a resistivity of 15.0 MΩ·cm) are added, and the dissolving temperature was 90° C. In the activation device 11, activation was conducted for 300 minutes with an ultraviolet power density of 30 W/m$^3$, and an activation temperature of 20° C., to obtain a vanadium electrolyte with a total impurity content of less than 0.25% (except for the effective components).

Example 4

In this example, vanadium oxytrichloride (with a purity of above 3N) was used as a raw material, and the throughput was 30 kg/h. In the liquid phase hydrolysis reaction tank 2-1, clean water (having a resistivity of 15.0 MΩ·cm) and vanadium oxytrichloride were added in a mass ratio of 20, and the operation temperature was set to be 30° C., to obtain a slurry of vanadium pentoxide. The slurry entered the washing filter 2-2 to be subjected to washing with clean water (having a resistivity of 15.0 MΩ·cm) and filtration, to obtain washing liquid and vanadium pentoxide precipitate powder, wherein the washing liquid was transmitted to the wastewater treatment system, and the vanadium pentoxide precipitate was preheated by the preheating system and then entered the reduction fluidized bed. In the reduction fluidized bed 5, the reducing gas introduced was coal gas, the volume fraction of coal gas in the mixed gas of the nitrogen gas and coal gas introduced into the reduction fluidized bed 5 was 90%, the average residence time of the powder was 20 min, and the operation temperature was 700° C., and a low-valence vanadium oxide having an average vanadium valence of 3.5 and a purity of 99.85% was obtained. In the dissolution reactor, electronic-grade concentrated sulfuric acid and clean water (having a resistivity of 15.0 MΩ·cm) are added, and the dissolving temperature was 30° C. In the activation device 11, activation was conducted for 30 minutes with an ultraviolet power density of 300 W/m$^3$, and an activation temperature of 45° C., to obtain a high-purity vanadium electrolyte with a total impurity content of less than 0.03% (except for the effective components).

Example 5

In this example, vanadium oxytrichloride (with a purity of above 4N) was used as a raw material, and the throughput was 300 kg/h. In the liquid phase hydrolysis reaction tank 2-1, clean water (having a resistivity of 18.0 MΩ·cm) and vanadium oxytrichloride were added in a mass ratio of 10, and the operation temperature was set to be 60° C., to obtain a slurry of vanadium pentoxide. The slurry entered the washing filter 2-2 to be subjected to washing with clean water (having a resistivity of 18.0 MΩ·cm) and filtration, to obtain washing liquid and vanadium pentoxide precipitate powder, wherein the washing liquid was transmitted to the wastewater treatment system, and the vanadium pentoxide precipitate was preheated by the preheating system and then entered the reduction fluidized bed. In the reduction fluidized bed 5, the reducing gas introduced was hydrogen gas, the volume fraction of hydrogen gas in the mixed gas of the hydrogen gas and coal gas introduced into the reduction fluidized bed 5 was 60%, the average residence time of the powder was 90 min, and the operation temperature was 600° C., and a low-valence vanadium oxide having an average vanadium valence of 3.5 and a purity of 99.98% was obtained. In the dissolution reactor, electronic-grade concentrated sulfuric acid and clean water (having a resistivity of 18.0 MΩ·cm) are added, and the dissolving temperature was 60° C. In the activation device 11, activation was conducted for 200 minutes with an ultraviolet power density of 200 W/m$^3$, and an activation temperature of 40° C., to obtain a high-purity vanadium electrolyte with a total impurity content of less than 0.005% (except for the effective components).

Example 6

In this example, vanadium oxytrichloride (with a purity of above 5N) was used as a raw material, and the throughput was 3000 kg/h. In the liquid phase hydrolysis reaction tank 2-1, clean water (having a resistivity of 18.0 MΩ·cm) and vanadium oxytrichloride were added in a mass ratio of 3, and the operation temperature was set to be 50° C., to obtain a slurry of vanadium pentoxide. The slurry entered the washing filter 2-2 to be subjected to washing with clean water (having a resistivity of 18.0 MΩ·cm) and filtration, to obtain washing liquid and vanadium pentoxide precipitate powder, wherein the washing liquid was transmitted to the wastewater treatment system, and the vanadium pentoxide precipitate was preheated by the preheating system and then entered the reduction fluidized bed. In the reduction fluidized bed 5, the reducing gas introduced was hydrogen gas, the volume fraction of hydrogen gas in the mixed gas of the hydrogen gas and coal gas introduced into the reduction fluidized bed 5 was 50%, the average residence time of the powder was 30 min, and the operation temperature was 550° C., and a low-valence vanadium oxide having an average vanadium valence of 3.5 and a purity of 99.997% was obtained. In the dissolution reactor, electronic-grade concentrated sulfuric acid and clean water (having a resistivity of 18.0 MΩ·cm) are added, and the dissolving temperature was 50° C. In the activation device 11, activation was conducted for 150 minutes with an ultraviolet power density of 100 W/m$^3$, and an activation temperature of 30° C., to obtain a high-purity vanadium electrolyte with a total impurity content of less than 5 ppm (except for the effective components).

Example 7

In this example, vanadium oxytrichloride (with a purity of above 6N) was used as a raw material, and the throughput was 3000 kg/h. In the liquid phase hydrolysis reaction tank 2-1, clean water (having a resistivity of 18.0 MΩ·cm) and vanadium oxytrichloride were added in a mass ratio of 3, and the operation temperature was set to be 50° C., to obtain a slurry of vanadium pentoxide. The slurry entered the washing filter 2-2 to be subjected to washing with clean water (having a resistivity of 18.0 MΩ·cm) and filtration, to obtain washing liquid and vanadium pentoxide precipitate powder, wherein the washing liquid was transmitted to the wastewater treatment system, and the vanadium pentoxide precipitate was preheated by the preheating system and then entered the reduction fluidized bed. In the reduction fluidized bed 5, the reducing gas introduced was hydrogen gas, the volume fraction of hydrogen gas in the mixed gas of the hydrogen gas and coal gas introduced into the reduction fluidized bed 5 was 50%, the average residence time of the powder was 30 min, and the operation temperature was 550° C., and a low-valence vanadium oxide having an average vanadium valence of 3.5 and a purity of 5N5 (i.e., a purity of 99.9995%) was obtained. In the dissolution reactor, electronic-grade concentrated sulfuric acid and clean water (having a resistivity of 18.0 MΩ·cm) are added, and the dissolving temperature was 50° C. In the activation device 11, activation was conducted for 150 minutes with an ultraviolet power density of 100 W/m$^3$, and an activation temperature of 30° C., to obtain a high-purity vanadium electrolyte with a total impurity content of less than 1 ppm (except for the effective components).

The contents which are not illustrated in detail in the present invention belong to the well-known technologies in the art.

Of course, the present invention can also provide a variety of examples. According to the disclosure of the present invention, those skilled in the art can make various corresponding changes and transformations without departing from the spirit and essence of the present invention. However, these corresponding changes and transformations shall all fall within the protection scope of the claims of the present invention.

What is claimed is:

1. A system for preparing a vanadium battery high-purity electrolyte, comprising a vanadium oxytrichloride storage tank, a liquid phase hydrolysis device, a vanadium pentoxide feeding device, a preheating system, a reduction fluidized bed, a combustion chamber, a cooling system, a secondary cooling system, a low-valence vanadium oxide feeding device, a dissolution reactor and an activation device;

wherein the liquid phase hydrolysis device comprises a liquid phase hydrolysis reaction tank and a washing filter;

the vanadium pentoxide feeding device comprises a vanadium pentoxide hopper and a vanadium pentoxide screw feeder;

the preheating system comprises a venturi preheater, a primary cyclone preheater, a secondary cyclone preheater and a bag-type dust collector;

the reduction fluidized bed comprises a feeder, a bed body, a discharger, a gas heater, a gas purifier and a first cyclone separator;

the cooling system comprises a venturi cooler, a cyclone cooler and a second cyclone separator;

the low-valence vanadium oxide feeding device comprises a low-valence vanadium oxide hopper and a low-valence vanadium oxide screw feeder;

wherein a feed outlet at the bottom of the vanadium oxytrichloride storage tank is connected with a chloride inlet of the liquid phase hydrolysis reaction tank through a pipeline; a clean water inlet of the liquid phase hydrolysis reaction tank is connected with a clean water main pipe through a pipeline; an acid gas outlet of the liquid phase hydrolysis reaction tank is connected with a tail gas treatment system; a slurry outlet of the liquid phase hydrolysis reaction tank is connected with a slurry inlet of the washing filter through a pipeline; a clean water inlet of the washing filter is connected with the clean water main pipe; a washing liquid outlet of the washing filter is connected with a wastewater treatment system through a pipeline; and a solid material outlet of the washing filter is connected with a feed inlet of the vanadium pentoxide hopper through a pipeline;

a feed outlet at the bottom of the vanadium pentoxide hopper is connected with a feed inlet of the vanadium pentoxide screw feeder; and a feed outlet of the vanadium pentoxide screw feeder is connected with a feed inlet of the venturi preheater through a pipeline;

a gas inlet of the venturi preheater is connected with a gas outlet of the combustion chamber through a pipeline; a gas outlet of the venturi preheater is connected with a gas inlet of the primary cyclone preheater through a pipeline; a gas outlet of the primary cyclone preheater is connected with a gas inlet of the secondary cyclone preheater through a pipeline; a feed outlet of the primary cyclone preheater is connected with a feed inlet of the feeder through a pipeline; a gas outlet of the secondary cyclone preheater is connected with a gas inlet of the bag-type dust collector through a pipeline; a feed outlet of the secondary cyclone preheater is connected with the feed inlet of the feeder through a pipeline; a gas outlet of the bag-type dust collector is connected with the tail gas treatment system; and a feed outlet of the bag-type dust collector is connected with the feed inlet of the feeder through a pipeline;

an aeration air inlet of the feeder is connected with a purified nitrogen gas main pipe; a feed outlet of the feeder is connected with a feed inlet of the bed body through a pipeline; a gas inlet of the bed body is connected with a gas outlet of the gas heater through a pipeline; a gas inlet of the gas heater is connected with a gas outlet of the second cyclone separator and a gas outlet of the gas purifier through pipelines; a combustion air inlet of the gas heater is connected with a compressed air main pipe; a fuel inlet of the gas heater is connected with a fuel main pipe; a gas inlet of the gas purifier is connected with a reducing gas main pipe; a feed outlet of the bed body is connected with a feed inlet of the discharger through a pipeline; an aeration air inlet of the discharger is connected with the purified nitrogen gas main pipe; a feed outlet of the discharger is connected with a feed inlet of the venturi cooler through a pipeline; a gas outlet of the bed body is connected with a gas inlet of the first cyclone separator through a pipeline; a feed outlet of the first cyclone separator is connected with the feed inlet of the discharger through a pipeline; and a gas outlet of the first cyclone separator is connected with a gas inlet of the combustion chamber through a pipeline;

a combustion air inlet of the combustion chamber is connected with the compressed air main pipe; and the gas outlet of the combustion chamber is connected with the gas inlet of the venturi preheater through a pipeline;

a gas inlet of the venturi cooler is connected with the purified nitrogen gas main pipe; a gas outlet of the venturi cooler is connected with a gas inlet of the cyclone cooler through a pipeline;

a gas outlet of the cyclone cooler is connected with a gas inlet of the second cyclone separator through a pipeline; a feed outlet of the cyclone cooler is connected with a feed inlet of the secondary cooling device through a pipeline; the gas outlet of the second cyclone separator is connected with a gas inlet of the gas heater through a pipeline; and a feed outlet of the second cyclone separator is connected with a feed inlet of the secondary cooling device through a pipeline;

a feed outlet of the secondary cooling device is connected with a feed inlet of the low-valence vanadium oxide hopper through a pipeline; a process water inlet of the secondary cooling device is connected with a process water main pipe through a pipeline; and a water outlet of the secondary cooling device is connected with a water cooling system through a pipeline;

a feed outlet at the bottom of the low-valence vanadium oxide hopper is connected with a feed inlet of the low-valence vanadium oxide screw feeder; and a feed outlet of the low-valence vanadium oxide screw feeder is connected with a feed inlet of the dissolution reactor through a pipeline;

a clean water inlet of the dissolution reactor is connected with the clean water main pipe through a pipeline; a concentrated sulfuric acid inlet of the dissolution reactor is connected with a concentrated sulfuric acid main pipe through a pipeline; a gas outlet of the dissolution reactor is connected with the tail gas treatment system; and a primary electrolyte outlet of the dissolution reactor is connected with a primary electrolyte inlet of the activation device through a pipeline.

2. The system for preparing a vanadium battery high-purity electrolyte according to claim 1, wherein the bed body of the reduction fluidized bed is in the form of a rectangular multi-bin, with a built-in vertical baffle.

3. A method for preparing a vanadium battery high-purity electrolyte using the system of claim 1, comprising the following steps:

forming vanadium oxytrichloride liquid in the vanadium oxytrichloride storage tank and moving the vanadium oxytrichloride liquid into the liquid phase hydrolysis reaction tank through a pipeline, and then subject the vanadium oxytrichloride to hydrolysis precipitation together with clean water from the clean water main pipe forming a mixed slurry of vanadium pentoxide precipitate and hydrochloric acid solution; transmitting the produced mixed slurry of vanadium pentoxide precipitate and hydrochloric acid solution to the tail gas treatment system through a pipeline; introducing the mixed slurry to the washing filter to be subjected to washing with clean water and filtration to obtain washing liquid and vanadium pentoxide precipitate powder; transmitting the washing liquid to the wastewater treatment system; and transmitting the vanadium pentoxide precipitate to the vanadium pentoxide hopper;

forming the vanadium pentoxide precipitate in the vanadium pentoxide hopper to be sent to the primary cyclone preheater through the vanadium pentoxide screw feeder and the venturi preheater, and transmitting the vanadium pentoxide precipitate to the bed body through the feeder together with the fine powder recovered by the secondary cyclone preheater and the bag-type dust collector; and introducing purified nitrogen gas from the purified nitrogen gas main pipe into the venturi cooler, the cyclone cooler and the second cyclone separator, to be merged with the purified reducing gas from the gas purifier, to be preheated by the gas heater and then be transmitted to the bed body, such that the vanadium pentoxide powder material is kept at a fluidized state and reduced to obtain low-valence vanadium oxide powder having an average vanadium valence of 3.5 and reduction flue gas;

introducing the low-valence vanadium oxide to enter the cyclone cooler through the discharger and the venturi cooler, to enter the dissolution reactor through the secondary cooling device, the low-valence vanadium oxide hopper and the low-valence vanadium oxide screw feeder together with the fine powder recovered by the second cyclone separator, to undergo dissolution reaction with clean water from the clean water main pipe and concentrated sulfuric acid from the concentrated sulfuric acid main pipe to obtain a primary electrolyte and acid mist gas, transmitting the produced acid mist gas to the tail gas treatment system, and activating the primary electrolyte by the activation device, to obtain the vanadium battery high-purity electrolyte;

wherein the first cyclone separator removes dust from the produced reduction flue gas, and then transmit produced reduction flue gas to the combustion chamber together with combustion air, and the produced reduction flue gas enters the venturi preheater, the primary cyclone preheater and the secondary cyclone preheater, and is subjected to dust removing by the bag-type dust collector and then transmitted to the tail gas treatment system.

4. The method for preparing a vanadium battery high-purity electrolyte according to claim 3, wherein the raw material of vanadium oxytrichloride has a purity of 99%-99.9999%.

5. The method for preparing a vanadium battery high-purity electrolyte according to claim 3, wherein in the liquid phase hydrolysis reaction tank, the mass ratio of clean water to vanadium oxytrichloride added is 0.5-20, and the operation temperature is 30-90° C.

6. The method for preparing a vanadium battery high-purity electrolyte according to claim 3, wherein the reducing gas introduced into the reducing gas purifier is hydrogen gas or coal gas.

7. The method for preparing a vanadium battery high-purity electrolyte according to claim 3, wherein in the reduction fluidized bed body, the operation temperature is 300-700° C. in the reduction, and after the reducing gas is purified by the purifier, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 20-120 min.

8. The method for preparing a vanadium battery high-purity electrolyte according to claim 3, wherein in the dissolution reactor, the resistivity of the added clean water is not less than 12.0 MΩ·cm, the concentrated sulfuric acid is electronic-grade concentrated sulfuric acid, and the dissolution temperature is 30-90° C.

9. The method for preparing a vanadium battery high-purity electrolyte according to claim 3, wherein the vanadium battery high-purity electrolyte is a mixed electrolyte with the molar concentration ratio of vanadium ions V(III) to V(IV) of 1:1, and the average valence of vanadium ions is 3.5.

10. The method for preparing a vanadium battery high-purity electrolyte according to claim 3, wherein in the activation device, the vanadium ions are activated by means of ultraviolet, wherein the dissolution and activation time is 30-300 minutes, the dissolution and activation temperature is 20-45° C., and the power density is 10-300 W/m$^3$.

* * * * *